US009828506B2

(12) United States Patent
Grady et al.

(10) Patent No.: US 9,828,506 B2
(45) Date of Patent: Nov. 28, 2017

(54) REJUVENATION OF RECLAIMED ASPHALT

(71) Applicant: ARIZONA CHEMICAL COMPANY, LLC, Jacksonville, FL (US)

(72) Inventors: William Lewis Grady, Savannah, GA (US); Tresha Overstreet, Pooler, GA (US); Charles David Moses, Savannah, GA (US); David Jan Cornelius Broere, Amsterdam (NL); Laurent Porot, Almere (NL)

(73) Assignee: Kraton Chemical, LLC, Jacksonville, FL (US)

( * ) Notice: Subject to any disclaimer, the term of this patent is extended or adjusted under 35 U.S.C. 154(b) by 0 days.

(21) Appl. No.: 14/364,805

(22) PCT Filed: Apr. 25, 2013

(86) PCT No.: PCT/US2013/038271
§ 371 (c)(1),
(2) Date: Jun. 12, 2014

(87) PCT Pub. No.: WO2013/163463
PCT Pub. Date: Oct. 31, 2013

(65) Prior Publication Data
US 2015/0240081 A1 Aug. 27, 2015

Related U.S. Application Data

(63) Continuation-in-part of application No. PCT/US2012/068994, filed on Dec. 11, 2012.

(60) Provisional application No. 61/638,989, filed on Apr. 26, 2012.

(51) Int. Cl.
C08L 95/00 (2006.01)
C08L 91/00 (2006.01)
C08K 3/34 (2006.01)
E01C 7/18 (2006.01)
E01C 11/00 (2006.01)

(52) U.S. Cl.
CPC .............. *C08L 95/00* (2013.01); *C08K 3/34* (2013.01); *C08L 91/00* (2013.01); *E01C 7/18* (2013.01); *E01C 11/00* (2013.01); *C08L 2555/22* (2013.01); *C08L 2555/24* (2013.01); *C08L 2555/34* (2013.01); *C08L 2555/64* (2013.01); *Y02P 20/582* (2015.11)

(58) Field of Classification Search
CPC ......... C08L 95/00; C09D 195/00; C10C 3/00; C08J 11/00
See application file for complete search history.

(56) References Cited

U.S. PATENT DOCUMENTS 2,877,129 A 3/1959 Hardman
4,154,710 A 5/1979 Maldonado et al.
4,207,231 A 6/1980 Goodrich
4,373,960 A 2/1983 Ward, Jr.
4,479,827 A 10/1984 Ward
4,492,781 A 1/1985 Duszak et al.
4,549,834 A 10/1985 Allen
4,806,166 A 2/1989 Schilling et al.
5,180,428 A 1/1993 Koleas
5,504,152 A 4/1996 Schluenz et al.
5,536,307 A 7/1996 McGovern
5,755,865 A * 5/1998 Lukens .................. C08L 95/00
 106/279
5,766,333 A 6/1998 Lukens
5,904,760 A 5/1999 Hayner
6,117,227 A 9/2000 Kitagawa
6,290,152 B1 9/2001 Zickell
6,495,074 B1 12/2002 Carr
(Continued)

FOREIGN PATENT DOCUMENTS

CA 608668 A 11/1960
CA 2846931 A1 4/2013
(Continued)

OTHER PUBLICATIONS

Memon, G. M., et al. Glass Transition Measurements of Asphalts by DSC. Journal of Thermal Analysis, vol. 49 (1997) pp. 601-607.
Unknown. Standard Test Methods for Titer of Fatty Acids. ASTM Designation: D 1982-85 (Reapproved 1999).
International Search Report and Written Opinion, dated Jun. 20, 2013. PCT Application No. PCT/US2013/038271 filed Apr. 25, 2013.
International Search Report and Written Opinion, dated Jun. 20, 2013. PCT Application No. PCT/US2013/038277 filed Apr. 25, 2013.
(Continued)

*Primary Examiner* — Jennifer A Smith
*Assistant Examiner* — Alexandra M Moore

(57) ABSTRACT

Asphalt compositions comprising reclaimed asphalt and an ester-functional rejuvenating agent derived from tall oil are disclosed. Rejuvenated binder compositions are also included. The rejuvenating agents restore to reclaimed asphalt desirable properties of virgin asphalt. Reduced glass-transition onset temperatures and improved creep stiffness in the rejuvenated binders translate to improved low-temperature cracking resistance in the asphalt. The rejuvenating agents impart desirable softening at low dosage while also maintaining acceptable penetration values. Dynamic shear rheometry results demonstrate that criteria for asphalt compositions under low, intermediate, and high temperature conditions can be achieved, and the asphalt will have good fatigue cracking resistance and rutting avoidance. The rejuvenating agents reduce the temperature needed to compact or mix asphalt compositions, which conserves energy and reduces cost. The rejuvenated asphalt and binder compositions enable greater use of reclaimed asphalt, especially RAP, and help the road construction industry reduce its reliance on virgin, non-renewable materials.

9 Claims, No Drawings

(56) References Cited

U.S. PATENT DOCUMENTS

| | | |
|---|---|---|
| 6,641,896 B2 | 11/2003 | Fensel et al. |
| 6,696,125 B2 | 2/2004 | Zanchetta et al. |
| 6,764,542 B1 | 7/2004 | Lackey et al. |
| 7,008,670 B1 | 3/2006 | Freisthler |
| 7,256,162 B2 | 8/2007 | Pollack et al. |
| 7,357,594 B2 | 4/2008 | Takamura |
| 7,811,372 B2 | 10/2010 | Nigen-Chaidron et al. |
| 8,034,172 B2 | 10/2011 | Naidoo et al. |
| 8,076,399 B2 | 12/2011 | Laurens et al. |
| 8,679,245 B2 | 3/2014 | Reinke et al. |
| 8,789,773 B2 | 7/2014 | Teeter, Jr. et al. |
| 2002/0009572 A1 | 1/2002 | Davies |
| 2002/0058734 A1 | 5/2002 | Harlan |
| 2002/0068776 A1 | 6/2002 | Guo et al. |
| 2003/0201701 A1 | 10/2003 | Banicevic |
| 2005/0018864 A1 | 1/2005 | Dong |
| 2007/0203265 A1 | 8/2007 | Pharr |
| 2008/0041276 A1 | 2/2008 | Riebesehl et al. |
| 2008/0069368 A1 | 3/2008 | Shumard |
| 2009/0137705 A1 | 5/2009 | Faucon Dumont et al. |
| 2009/0318602 A1* | 12/2009 | Deneuvillers ........ C09D 167/04 524/425 |
| 2010/0034586 A1 | 2/2010 | Bailey et al. |
| 2010/0041798 A1 | 2/2010 | Nigen-Chaidron et al. |
| 2010/0147190 A1 | 6/2010 | Naidoo et al. |
| 2010/0170417 A1 | 7/2010 | Naidoo et al. |
| 2010/0184903 A1 | 7/2010 | Pharr |
| 2011/0015312 A1 | 1/2011 | Laurens et al. |
| 2012/0315088 A1 | 12/2012 | Deneuvillers et al. |
| 2013/0220175 A1 | 8/2013 | Zickell |
| 2014/0338565 A1 | 11/2014 | Severance et al. |
| 2015/0240081 A1 | 8/2015 | Grady et al. |

FOREIGN PATENT DOCUMENTS

| | | | |
|---|---|---|---|
| DE | 19501212 A1 | 6/1996 | |
| EP | 1721938 A2 * | 11/2006 | ............ C08L 95/005 |
| EP | 1645595 B1 | 8/2008 | |
| EP | 1466878 | 6/2014 | |
| JP | 55-161853 | 12/1980 | |
| JP | 2005-154467 | 6/2005 | |
| JP | 2005154467 A * | 6/2005 | |
| JP | 2011-506634 | 3/2011 | |
| JP | 2014-547349 | 12/2012 | |
| JP | 2015505893 A * | 2/2015 | |
| RU | 2004513 C1 | 12/1993 | |
| SU | 220821 A1 | 12/1968 | |
| SU | 1768548 | 10/1992 | |
| WO | WO2001018122 A1 | 3/2001 | |
| WO | WO2008019648 A1 | 2/2008 | |
| WO | WO2010077141 A1 | 7/2010 | |
| WO | WO2010110651 A1 | 9/2010 | |
| WO | WO2013090283 A1 | 6/2013 | |

OTHER PUBLICATIONS

Boyer, Robert E. Asphalt Rejuvenators—"Fact, or Fable". Presentation at the Transportation Systems 2000 (TS2K0 Workshop, San Antonio, Texas. Feb. 28-Mar. 3, 2000.

Brown, E.R. Preventative Maintenance of Asphalt Concrete Pavements. Presentated at the 1988 Annual Meeting of the Transportation Research Board. Jan. 1988.

Brownridge, Jim. The Role of an Asphalt Rejuvenator in Pavement Preservation: Use and Need for Asphalt Rejuvenation. Copendium of Papers from the First International Conference on Pavement Preservation. 2010.

Elseifi, Mostafa et al. Reclaimed Asphalt Pavement—A Literature Review. A report of the findings of ICT R27-11, Determination of Usable Residual Asphalt Binder in RAP. Mar. 2007.

International Search Report and Written Opinion, dated Mar. 7, 2013. PCT Application No. PCT/US2012/068994 filed Dec. 11, 2012.

Mellema, Todd. Seal Coats and Rejuvenators. 38th Annual Rocky Mountain Asphalt Conference and Equipment Show. 2011.

O'Sullivan, Karen A. Rejuvenation of Reclaimed Asphalt Pavement (RAP) in Hot Mix Asphalt Recycling with High RAP Content. A Thesis Submitted to the Faculty of the Worcester Polytechnic Institute. Apr. 2011.

Search Report dated May 7, 2012, EP Application No. 11192991.5 filed Dec. 12, 2011.

* cited by examiner

REJUVENATION OF RECLAIMED ASPHALT

FIELD OF THE INVENTION

The invention relates to reclaimed asphalt compositions and rejuvenation thereof with tall oil-derived fatty esters.

BACKGROUND OF THE INVENTION

Reclaimed asphalt includes reclaimed asphalt pavement (RAP), reclaimed asphalt shingles (RAS), asphalt reclaimed from plant waste, and asphalt recovered from roofing felt, among other sources.

Asphalt pavement is one of the most recycled materials in the world, finding uses in shoulders of paved surfaces and bridge abutments, as gravel substitutes on unpaved roads, and as a replacement for virgin aggregate and binder in asphalt pavements. Recycled asphalt pavement is typically limited, however, to use as sub-surface "black rock" or in limited amounts in asphalt base and surface layers. The usefulness of recycled material in the critical surface layers is limited because asphalt deteriorates with time; it loses flexibility, becomes oxidized and brittle, and tends to crack, particularly under stress or at low temperatures. The effects are due to aging of the organic component of the asphalt, i.e., the bitumen-containing binder, particularly upon exposure to weather. The aged binder is also highly viscous. Consequently, reclaimed asphalt pavement has different properties than virgin asphalt and is difficult to process. Untreated RAP can be used only sparingly; generally, an asphalt mixture comprising up to 30 wt. % of RAP can be used as sub-surface black rock. Moreover, because of the higher demands of the pavement surface, untreated RAP use there is generally limited to 15-25%.

Reclaimed asphalt can be blended with virgin asphalt, virgin binder, or both (see, e.g., U.S. Pat. No. 4,549,834). Rejuvenating agents have been developed to increase the amount of reclaimed asphalt that can be incorporated in both the base and surface layers. Rejuvenating agents restore a portion of the asphalt paving properties and binder bitumen physical properties, such as viscoelastic behavior, so that the reclaimed asphalt properties more closely resemble those of virgin asphalt. Improving the properties of recycled asphalt, and particularly the properties of bitumen binder in RAP, allows increased amounts of RAP to be used in asphalt mixtures without compromising the properties and lifetime of the final pavement.

Commonly used rejuvenating agents for RAP include low-viscosity products obtained by crude oil distillation or other hydrocarbon oil-based materials (see, e.g., U.S. Pat. No. 5,766,333 or 6,117,227).

Rejuvenating agents of plant origin have also been described. See, for example, U.S. Pat. No. 7,811,372 (rejuvenating agents comprising bitumen and palm oil); U.S. Pat. No. 7,008,670 (soybean oil, alkyl esters from soybean oil, and terpenes used for sealing or rejuvenating); U.S. Pat. Appl. Publ. No. 2010/0034586 (rejuvenating agent based on soybean, sunflower, rapeseed, or other plant-derived oils); and U.S. Pat. Appl. Publ. No. 2008/0041276 (plasticizers for recycled asphalt that may be vegetable oils or alkyl esters made from vegetable oils). U.S. Pat. No. 8,076,399 describes a binder composition comprising a resin of vegetable origin, a vegetable oil, and a polymer having anhydride, carboxylic acid, or epoxide functionality, but this binder is not specifically taught for rejuvenation. Although vegetable oils can provide desirable softening of aged binders, they are prone to leaching from the rejuvenated asphalt.

More recently introduced are rejuvenating agents derived from cashew nut shell oil, which contain mostly cardanol, a phenolic compound having a C15 unsaturated chain (see, e.g., PCT Internat. Publ. Nos. WO 2010/077141 and WO 2010/110651). Such products are available commercially from Ventraco Chemie, B.V., such as RheoFalt® HP-EM.

Various fractions isolated from crude tall oil (CTO) distillation have been used in asphalt compositions, although they are not specifically taught for rejuvenation. See, for instance, U.S. Pat. Appl. Publ. No. 2010/0170417 (CTO distillation fractions as cutting solvents use in asphalt compositions); U.S. Pat. No. 8,034,172 (distilled or oxidized tall oil components for use in asphalt compositions); and U.S. Pat. Nos. 4,479,827 and 4,373,960 (patching compositions comprising asphalt, tall oil, and possibly an organopolysiloxane).

Esters made from tall oil fatty acid (TOFA) or downstream products of CTO such as Monomer acid (a unique product described, e.g., in U.S. Pat. No. 7,256,162), dimer acids, or the like, have not been previously suggested for use as rejuvenating agents for reclaimed asphalt.

Improved rejuvenating agents for reclaimed asphalt are needed. In particular, the industry needs non-crystalline additives for reclaimed asphalt that can improve low-temperature cracking resistance and fatigue cracking resistance while maintaining good rutting resistance. Better rejuvenating agents would reduce the cost of road construction by enabling greater use of RAP in new pavements and reducing reliance on virgin, non-renewable binder and aggregate materials. A preferred rejuvenating agent would reduce the binder viscosity to a level comparable to that of virgin binder and would also lower the glass-transition temperature of the binder to allow for softer, more easily processed asphalt mixtures. Ideally, the rejuvenating agent would derive from renewable resources, would have good thermal stability at the elevated temperatures normally used to mix and lay asphalt, and could restore the original performance grading to the binder.

SUMMARY OF THE INVENTION

In one aspect, our invention relates to an asphalt composition comprising reclaimed asphalt and an ester-functional rejuvenating agent derived from tall oil. The reclaimed asphalt comprises aggregate and an aged binder. The rejuvenating agent has a titer by ASTM D1982 less than 30° C. and is present in an amount effective to reduce the glass-transition onset temperature of the aged binder by at least 5° C. compared with the glass-transition onset temperature of the aged binder without the rejuvenating agent. Our invention includes binder compositions suitable for use with reclaimed asphalt and methods for making the inventive asphalt and binder compositions.

In another aspect, the invention relates to an asphalt composition comprising an ester-functional rejuvenating agent derived from tall oil and at least 15 wt. % of reclaimed asphalt comprising aged binder. The rejuvenating agent is present in an amount within the range of 0.1 to 20 wt. % based on the combined amounts of aged binder and rejuvenating agent. The aged binder and rejuvenating agent mixture form a rejuvenated binder. The rejuvenated binder has a ring and ball softening point by EN 1427 at least 5° C. lower than that of an aged binder without the rejuvenating agent and has a penetration value at 25° C. by EN 1426 at least double that of the aged binder without the rejuvenating agent. Alternatively, the rejuvenated binder has a performance grade on the PG scale at least one grade lower than that of an aged binder without the rejuvenating agent.

In some inventive asphalt compositions, the rejuvenating agent derives from an improved thermal stability alcohol. The rejuvenating agents for these compositions have exceptionally low cloud and pour points.

Our invention also includes paved surfaces comprising the inventive binders and asphalt compositions.

We found, surprisingly, that by incorporating an ester-functional rejuvenating agent derived from tall oil we can revitalize the aged bitumen binder of reclaimed asphalt and generate rejuvenated binders with physical properties similar to those of the original performance grade of the bitumen before it was aged. The rejuvenated binders demonstrate reduced glass-transition onset temperatures, an indication of desirable softening of the aged, brittle binder. Results from dynamic shear rheometry further validate the good low-temperature cracking resistance and improved fatigue cracking resistance of the rejuvenated asphalts. The DSR results show that rejuvenated binders also have good elevated temperature performance, which relates to rutting avoidance. Rutting is a common failure mode for asphalt road surfaces, particularly those that experience high traffic rates or high weight traffic.

We also found that certain rejuvenating agents derived from tall oil restore desirable softening at low dosage while also maintaining acceptable penetration values. The rejuvenating agents are valuable for reducing the temperature needed to compact or mix asphalt compositions, which conserves energy and reduces cost. The inventive binders have good ductility, and they lose properties upon aging only sparingly, similar to virgin binder.

In sum, the tall oil-derived rejuvenating agents of our invention allow use of higher levels of recovered asphalt in asphalt mixtures, by reducing the glass transition temperature (Tg) of the binder, thereby improving the processability of the recovered asphalt. Incorporating more recovered asphalt in roads lowers costs of both binder and aggregate and helps the road construction industry reduce its reliance on virgin, non-renewable materials.

DETAILED DESCRIPTION OF THE INVENTION

The invention relates to rejuvenation of asphalt compositions with an ester-functional rejuvenating agent derived from tall oil. In particular, it relates to renewal of reclaimed asphalt, especially reclaimed asphalt pavement (RAP), which contains aggregate and aged asphalt binder.

In the literature, the term "asphalt" is sometimes used to describe the binder, and sometimes used to describe the binder plus the aggregate. In this description, "asphalt" refers to the composite material comprising a bituminous binder and aggregate, which is generally used for paving applications. Such asphalt is also known as "asphalt concrete." Asphalt is commonly qualified for paving applications. Examples of asphalt grades used in paving applications include stone mastic asphalt, soft asphalt, hot rolled asphalt, dense-graded asphalt, gap-graded asphalt, porous asphalt, mastic asphalt, and other asphalt types. Typically, the total amount of bituminous binder in asphalt is from 1 to 10 wt. % based on the total weight of the asphalt, in some cases from 2.5 to 8.5 wt. % and in some cases from 4 to 7.5 wt. %.

"Reclaimed asphalt" includes reclaimed asphalt pavement (RAP), reclaimed asphalt shingles (RAS), reclaimed asphalt from plant waste, reclaimed asphalt from roofing felt, and asphalt from other applications.

"Reclaimed asphalt pavement" (RAP) is asphalt that has been used previously as pavement. RAP may be obtained from asphalt that has been removed from a road or other structure, and then has been processed by well-known methods, including milling, ripping, breaking, crushing, and/or pulverizing. Prior to use, the RAP may be inspected, sized and selected, for instance, depending on the final paving application.

"Aggregate" (or "construction aggregate") is particulate mineral material suitable for use in asphalt. It generally comprises sand, gravel, crushed stone, and slag. Any conventional type of aggregate suitable for use in asphalt can be used. Examples of suitable aggregates include granite, limestone, gravel, and mixtures thereof.

"Bitumen" refers to a mixture of viscous organic liquids or semi-solids from crude oil that is black, sticky, soluble in carbon disulfide, and composed primarily of condensed aromatic hydrocarbons. Alternatively, bitumen refers to a mixture of maltenes and asphaltenes. Bitumen may be any conventional type of bitumen known to the skilled person. The bitumen may be naturally occurring. It may be crude bitumen, or it may be refined bitumen obtained as the bottom residue from vacuum distillation of crude oil, thermal cracking, or hydrocracking. The bitumen contained in or obtained from reclaimed asphalt pavement is further referred to as bitumen of RAP origin.

"Virgin bitumen" (also known as "fresh bitumen") refers to bitumen that has not been used, e.g., bitumen that has not been recovered from road pavement. Virgin bitumen is a component of virgin binder. "Virgin binder" is binder that has not been used previously for road paving.

"Virgin asphalt" refers to a combination of virgin aggregate with virgin bitumen or virgin binder. Virgin asphalt has not been used previously for paving.

"Binder" refers to a combination of bitumen and, optionally, other components. The other components could include elastomers, non-bituminous binders, adhesion promoters, softening agents, additional rejuvenating agents (other than those of the invention), or other suitable additives. Useful elastomers include, for example, ethylene-vinyl acetate copolymers, polybutadienes, ethylene-propylene copolymers, ethylene-propylene-diene terpolymers, butadiene-styrene block copolymers, styrene-butadiene-styrene (SBS) block terpolymers, isoprene-styrene block copolymers and styrene-isoprene-styrene (SIS) block terpolymers, or the like. Cured elastomer additives may include ground tire rubber materials.

"Aged binder" refers to binder that is present in or is recovered from reclaimed asphalt. Normally, the aged binder is not isolated from the reclaimed asphalt. Aged binder has high viscosity compared with that of virgin bitumen as a result of aging and exposure to outdoor weather. In some instances, "aged binder" is also used herein to refer to virgin binder that has been aged using the RTFO and PAV laboratory aging test methods described herein. "Aged binder" may also refer to hard, poor-quality, or out-of-spec virgin binders that could benefit from combination with a rejuvenating agent, particularly virgin binders having a ring-and-ball softening point greater than 65° C. by EN 1427 and a penetration value at 25° C. by EN 1426 less than or equal to 12 dmm.

"Rejuvenating agent" refers to a composition or mixture that is combined with aged binder or reclaimed asphalt (or their mixtures with virgin binder and/or virgin asphalt) to revitalize the aged binder or reclaimed asphalt and restore some or all of the original properties of virgin binder or virgin asphalt. "Ester-functional" rejuvenating agents have at least one ester group and are further described below.

"Derived from tall oil" means that the rejuvenating agent derives at least in part from a crude tall oil (CTO) component. CTO components include, e.g., tall oil fatty acid (TOFA), tall oil heads, tall oil rosin, and tall oil pitch. Tall oil derivatives suitable for making the ester-functional rejuvenating agents include acid-functional tall oil derivatives such as Monomer, dimer, and trimer acids made from TOFA, dimerized rosin acids, and refined fatty acids obtainable from tall oil.

The bitumen in the binder may be commercially available virgin bitumen such as a paving grade bitumen, i.e. suitable for paving applications. Examples of commercially available paving grade bitumen include, for instance, bitumen which in the penetration grade (PEN) classification system are referred to as PEN 35/50, 40/60 and 70/100 or bitumen which in the performance grade (PG) classification system are referred to as PG 64-22, 58-22, 70-22 and 64-28. Such bitumen is available from, for instance, Shell, Total and British Petroleum (BP). In the PEN classification the numeric designation refers to the penetration range of the bitumen as measured with the EN 1426 method, e.g. a 40/60 PEN bitumen corresponds to a bitumen with a penetration which ranges from 40 to 60 decimillimeters (dmm). In the PG classification (AASHTO MP 1 specification) the first value of the numeric designation refers to the high temperature performance and the second value refers to the low temperature performance as measured by a method which is known in the art as the Superpave$^{SM}$ system.

Binder Composition

In one aspect, the invention relates to a rejuvenated binder composition suitable for use with reclaimed asphalt. The binder composition comprises a combination of aged binder and an ester-functional rejuvenating agent derived from tall oil.

Suitable aged binder for use in the inventive compositions is present in or recovered from reclaimed asphalt, which can be RAP. Binder can be recovered from RAP by conventional means such as solvent extraction. The amount of binder in a reclaimed asphalt composition is generally known from the supplier, but may also be determined by methods known to the skilled person. For instance, a known amount of RAP may be treated with a suitable solvent, e.g. dichloromethane to extract the binder. The weight amount of binder in the extracted fraction may be measured, thereby determining the content of binder in the RAP. The amount of binder in the RAP typically may range from 1 to 10 wt. % based on the total weight of the RAP, in particular from 2.5 to 8.5 wt. % and more particularly from 4 to 7.5 wt. %.

Preferably, aged binder is not isolated from the reclaimed asphalt. Instead, the reclaimed asphalt is simply combined with a desirable amount of rejuvenating agent. In a preferred approach, the rejuvenating agent is combined and mixed with virgin binder, reclaimed asphalt, and optionally virgin asphalt to give the rejuvenated asphalt product.

The rejuvenated binder compositions comprise 0.1 to 20 wt. %, preferably 0.5 to 10 wt. %, of the rejuvenating agent based on the combined amounts of aged binder and rejuvenating agent. Suitable rejuvenating agents for use in the inventive binder compositions are described more fully below.

Asphalt Composition

In another aspect, the invention relates to an asphalt composition. The asphalt composition comprises reclaimed asphalt and an ester-functional rejuvenating agent derived from tall oil. The reclaimed asphalt comprises aggregate and an aged binder. The reclaimed asphalt, aggregate, and aged binder in the inventive composition are as defined above. Suitable rejuvenating agents are discussed below.

The Rejuvenating Agent

In the inventive asphalt and binder compositions, the rejuvenating agent is present in an amount within the range of 0.1 to 20 wt. %, preferably from 0.5 to 10 wt. %, based on the combined amounts of aged binder and rejuvenating agent.

The inventive asphalt and binder compositions comprise an ester-functional rejuvenating agent derived from tall oil. The rejuvenating agent is present in an amount effective to reduce the glass-transition onset temperature of the aged binder by at least 5° C. compared with the glass-transition onset temperature of the aged binder without the rejuvenating agent.

The ester-functional rejuvenating agents derive from tall oil. The acid portion will normally comprise C8-C20 fatty acids with some degree (often a high degree) of unsaturation. The fatty acid can be in a polymerized form, as in dimerized fatty acid mixtures. Preferably, the tall oil fatty acid will comprise one or more of oleic acid, linoleic acid, linolenic acid, and palmitic acid. Also suitable are Monomer acid (defined below), dimer acids, tall oil heads, and the like, and mixtures thereof.

The alcohol portion of the rejuvenating agent can be primary, secondary, or tertiary; it can be a monol, diol, or polyol. The alcohol can also derive from polyethers such as triethylene glycol or polyethylene glycols. Phenolate esters are also suitable. Suitable alcohols include, for example methanol, ethanol, 1-propanol, isobutyl alcohol, 2-ethylhexanol, octanol, isodecyl alcohol, benzyl alcohol, cyclohexanol, ethylene glycol monobutyl ether, ethylene glycol, propylene glycol, diethylene glycol, triethylene glycol, neopentyl glycol, glycerol, trimethylolpropane, trimethylolethane, pentaerythritol, dipentaerythritol, sorbitol, sucrose, and the like, and mixtures thereof. Particularly preferred alcohols, also identified herein as "improved thermal stability alcohols," have a quaternary carbon located beta to the oxygen of any of its hydroxyl groups. Examples include trimethylolpropane, neopentyl glycol, trimethylolethane, pentaerythritol, dipentaerythritol, benzylic alcohols, and the like.

The ester-functional rejuvenating agent derives from tall oil, preferably from a tall oil fatty acid (TOFA) or a TOFA derivative (e.g., a TOFA dimer acid). Tall oil fatty acid is isolated from crude tall oil (CTO) by distillation. The CTO is a by-product of the Kraft wood pulping process. Distillation of CTO gives, in addition to tall oil fatty acid, a more volatile, highly saturated fraction of long-chain fatty acids (largely palmitic acid), known as "tall oil heads." Tall oil fatty acid is the next cut, which contains mostly C18 and C20 fatty acids having varying degrees of unsaturation (e.g., oleic acid, linoleic acid, linolenic acid, and various isomers of these). Another cut, known as distilled tall oil or "DTO," is a mixture of mostly tall oil fatty acid and a smaller proportion of tall oil rosin. Tall oil rosin ("TOR"), isolated next, consists largely of a C19-C20 tricyclic monocarboxylic acid. The bottom cut of the distillation is known as "tall oil pitch" or simply "pitch." Generally, any cut that contains at least some tall oil fatty acid is preferred for use in making an ester-functional rejuvenating agent.

As noted earlier, polymerized fatty acids can be used to make the tall oil-derived ester-functional rejuvenating agents. Unsaturated fatty acids are commonly polymerized using acid clay catalysts. Fatty acids having high levels of mono- or polyunsaturation are preferred. In this high-temperature process, the unsaturated fatty acids undergo intermolecular addition reactions by, e.g., the "ene reaction," to form polymerized fatty acids. The mechanism is complex and not well understood. However, the product comprises mostly dimerized fatty acid and a unique mixture of monomeric fatty acids. Distillation provides a fraction highly enriched in dimerized fatty acid, which is commonly known as "dimer acid." Such dimer acids are suitable for use in making the ester-functional rejuvenating agents.

The distillation of polymerized TOFA provides a fraction that is highly enriched in monomeric fatty acids and is known as "Monomer" (with a capital "M") or "Monomer acid." Monomer, a unique composition, is a preferred starting material for making ester-functional rejuvenating agents. Whereas natural source-derived TOFA largely consists of linear C18 unsaturated carboxylic acids, principally oleic and linoleic acids, Monomer contains relatively small amounts of oleic and linoleic acids, and instead contains significant amounts of branched and cyclic C18 acids, saturated and unsaturated, as well as elaidic acid. The more diverse and significantly branched composition of Monomer results from the catalytic processing carried out on TOFA during polymerization. The art recognizes that the reaction of Monomer with alcohols to make "Monomerate" esters will yield unique derivatives that differ from the corresponding TOFA-based esters. Monomer has been assigned CAS Registry Number 68955-98-6. Examples of Monomer products are Century® MO5 and MO6 fatty acids, products of Arizona Chemical Company. For more information about the composition of Monomer and its conversion to various esters, see U.S. Pat. No. 7,256,162, the teachings of which are incorporated herein by reference.

Suitable rejuvenating agents include, for example, ethylene glycol tallate (i.e., ethylene glycol ester of tall oil fatty acid), propylene glycol tallate, trimethylolpropane tallate, neopentyl glycol tallate, methyl tallate, ethyl tallate, glycerol tallate, oleyl tallate, octyl tallate, benzyl tallate, 2-ethylhexyl tallate, polyethylene glycol tallates, tall oil pitch esters, ethylene glycol Monomerate, glycerol Monomerate, trimethylolpropane Monomerate, neopentyl glycol Monomerate, 2-ethylhexyl Monomerate, ethylene glycol dimerate, 2-ethylhexyl dimerate, 2-ethylhexyl trimerate, and the like. Particularly preferred rejuvenating agents are tallates and Monomerates, especially trimethylolpropane tallate, ethylene glycol Monomerate, and glycerol Monomerate.

In some aspects of the invention, the rejuvenating agents preferably have a flash point greater than 200° C., more preferably greater than 220° C., most preferably greater than 250° C.

The rejuvenating agents are non-crystalline; they have a titer by ASTM D1982 less than 30° C., preferably less than 20° C., more preferably less than 10° C., and most preferably less than 0° C.

Preferably, the rejuvenating agents have a cloud point below 0° C., more preferably below −10° C., even more preferably below −20° C., and most preferably below −25° C. Cloud point is found by cooling a neat, molten sample gradually and observing the temperature at which the clear sample just becomes hazy.

In some of the inventive asphalt and binder compositions, the tall oil-derived rejuvenating agent is present in an amount effective to reduce the glass-transition onset temperature of the aged asphalt binder by at least 5° C., preferably by at least 10° C., compared with the glass-transition onset temperature of the aged asphalt binder without the rejuvenating agent. The glass-transition onset temperature can be determined by any desired method, but it is conveniently measured by differential scanning calorimetry (DSC) or the peak of the loss modulus by bending beam rheometry (BBR). Transitions in the DSC curve are noted as samples are cycled through a programmed increase and/or decrease of temperatures. In plots of heat flow (W/g) versus temperature, inflection points denote the onset of glass transition and the endpoint. The temperature range between the onset temperature and the endpoint is the "spread." A desirable rejuvenating agent will lower the onset temperature of glass transition and will also narrow the spread. DSC has been used previously as a diagnostic tool for evaluating asphalt compositions; see, e.g., R. F. Turner and J. F. Branthaven, "DSC Studies of Asphalts and Asphalt Components" in Asphalt Science and Technology, A. M. Usnami, ed., Marcel Dekker, Inc., NY (1997), pp. 59-101.

We surprisingly found that ester-functional rejuvenating agents derived from tall oil, when introduced at low to modest levels, can be effective in reducing the glass-transition onset temperature of aged asphalt binders by at least 5° C. The reduction is important because it correlates with an anticipated improvement in low-temperature cracking resistance in asphalt pavement. As the results in Tables 1 and 2 (below) suggest, a wide variety of tall oil esters, when used at 2.5 to 10 wt. % with aged asphalt binder, are effective in reducing the onset temperature of glass transition by at least 5° C. Many of the ester-functional rejuvenating agents derived from tall oil reduce the onset temperature of glass transition by at least 10° C., and some can reduce that temperature by as much as 20° C. On the other hand, other tested compositions are not effective in reducing the Tg onset temperature by at least 5° C. at the 10 wt. % level. For instance, as shown in Table 1, high-hydroxyl rosin ester (C16), terpene phenols (C18), polyterpenes (C23), and phenolic rosin esters (C24), among other classes, are ineffective in reducing the Tg onset temperature (see "Δ onset" column). Note that Tudalen® 65, a hydrocarbon flux oil currently used to rejuvenate reclaimed asphalt pavement, does not give the desired 5° C. reduction in Tg onset at the 10% additive level. Cardanol, the active component of another commercial rejuvenating agent (RheoFalt® HP-EM, product of Ventraco Chemie, B.V.), effectively reduces the Tg onset temperature, but cardanol is a long-chain unsaturated alkylate of a phenol and has no ester functionality.

In preferred asphalt and binder compositions of the invention, the tall oil-derived ester-functional rejuvenating agent is present in an amount effective to reduce the glass-transition temperature spread (or melting range) by at least 5° C., preferably by at least 10° C. As shown in Tables 1 and 2 (see "Δ spread" column), there are numerous examples of ester-functional rejuvenating agents that have this capability including, for example, trimethylolpropane tallate, ethylene glycol Monomerate, glycerol Monomerate, oleyl tallate, neopentyl glycol Monomerate, and others. Although somewhat less diagnostic than the reduction in Tg onset temperature, a narrower Tg spread for the binder generally indicates greater homogeneity, which can translate to better fatigue cracking resistance at ambient temperature for the asphalt compositions.

The asphalt and binder compositions can be made by combining components in any desired order. In one convenient approach, an asphalt composition is made by combining rejuvenating agent with virgin binder, then blending the resulting mixture with RAP. In another approach, the asphalt composition is made by combining rejuvenating agent with RAP, optionally with virgin asphalt.

Asphalt compositions of the invention preferably contain rejuvenating agent, 5 to 95 wt. % RAP, and at least some virgin binder. More preferred asphalt compositions contain 10 to 90 wt. % RAP, most preferably 30 to 90% RAP. Other preferred compositions comprise 1 to 99 wt. %, preferably 10 to 90 wt. %, more preferably 30 to 70 wt. % of virgin binder.

In one aspect, the invention relates to an asphalt composition comprising reclaimed asphalt and an ester-functional rejuvenating agent derived from tall oil as described above, wherein the asphalt composition further comprises virgin asphalt. The virgin asphalt comprises virgin binder and virgin aggregate. The asphalt composition comprises 1 to 99 wt. % of virgin aggregate based on the combined amounts of virgin asphalt, reclaimed asphalt, and rejuvenating agent.

Depending on the source, age, history, any pretreatment, and other factors, RAP will normally contain from 2 to 8 wt. %, more typically 3 to 6 wt. %, of aged asphalt binder. Therefore, the effective amount of rejuvenating agent can vary by asphalt source. In general, the rejuvenating agent is preferably used at 0.1 to 15 wt. %, more preferably 0.5 to 10 wt. %, even more preferably 2 to 8 wt. %, most preferably 3 to 6 wt. %, based on the amount of aged asphalt binder.

Further evidence of the value of ester-functional rejuvenating agents derived from tall oil comes from dynamic shear rheometry (DSR) data. Rheology, the study of the deformation and flow of matter, provides a fingerprint of the viscoelastic behavior of a bitumen, whether virgin, aged, conditioned, or treated. This measured behavior is correlated to performance of the bitumen within the aggregate asphalt, and subsequently to the performance of the road. The tests performed function based on the principles of linear viscoelasticity and the superposition principle, where strain on a material is proportional to the stress received. A stress is applied to the sample and the response and delay of that response (phase angle) are analyzed and used to calculate moduli that represent different properties of the sample.

Table 3 shows the improvement in low-temperature performance, particularly m-value and creep stiffness at −15° C. EG Monomerate, trimethylolpropane tallate, and glycerol Monomerate, for example, all perform well when compared with terpene phenols and other neutral additives. At ambient temperatures, the ester-functional rejuvenating agents provide a palpable reduction in G* sin δ of RAP binder, an indication of improved fatigue cracking properties in the ultimate asphalt composition. The benefits for low- and ambient-temperature performance are significant, but too often such benefits are obtained only by sacrificing elevated temperature properties such as resistance to rutting. As shown in Table 3, however, the low values (versus the control) of G*/sin δ determined at 70° C. indicate that binders containing ester-functional rejuvenating agents derived from tall oil will likely also perform well at elevated temperature. The test results are used to predict the amount of rut formation to be expected from use of a particular binder. The results in Table 3 suggest that softening of the binder by the rejuvenating agent will not create a rutting problem for the ultimate asphalt compositions, even on hot summer days.

In a preferred aspect, the ester-functional rejuvenating agent for the inventive asphalt or binder composition derives from one or more improved thermal stability alcohols. By "improved thermal stability alcohol," we mean an alcohol that has a quaternary carbon located beta to the oxygen of any of its hydroxyl groups. Examples include trimethylolethane, trimethylolpropane, neopentyl glycol, pentaerythritol, dipentaerythritol, benzylic alcohols, and the like, and mixtures thereof. In particular, we found that rejuvenating agents in which at least part of the ester component derives from an improved thermal stability alcohol give rejuvenating agents with desirably low cloud points (preferably less than −20° C.), low pour points (preferably less than −30° C.), and good to excellent low-temperature properties (see Table 4, below).

In another aspect, the invention relates to an asphalt composition comprising an ester-functional rejuvenating agent derived from tall oil and at least 15 wt. % of reclaimed asphalt comprising aged binder. The rejuvenating agent is present in an amount within the range of 0.1 to 20 wt. %, preferably 1 to 10 wt. %, more preferably 3 to 8 wt. %, based on the combined amounts of aged binder and rejuvenating agent. In addition, the aged binder and rejuvenating agent mixture forms a rejuvenated binder. The rejuvenated binder has a ring and ball softening point by EN 1427 at least 5° C., preferably at least 10° C., lower than that of an aged binder without the rejuvenating agent. Additionally, the rejuvenated binder has a penetration value at 25° C. by EN 1426 at least double, preferably at least triple, that of the aged binder without the rejuvenating agent. Suitable ester-functional rejuvenating agents derived from tall oil have already been described. Particularly preferred rejuvenating agents are trimethylolpropane tallates, ethylene glycol Monomerates, neopentyl glycol Monomerates, 2-ethylhexyl Monomerates, and glycerol Monomerates (see Tables 5-12 below).

In another aspect, the invention relates to an asphalt composition comprising an ester-functional rejuvenating agent derived from tall oil and at least 15 wt. % of reclaimed asphalt comprising aged binder. The rejuvenating agent is present in an amount within the range of 0.1 to 20 wt. %, preferably 1 to 10 wt. %, more preferably 3 to 8 wt. %, based on the combined amounts of aged binder and rejuvenating agent. In addition, the aged binder and rejuvenating agent mixture forms a rejuvenated binder. The rejuvenated binder has a PG grade at least one grade lower than that of an aged binder without the rejuvenating agent. For example, a shift in the PG grade from PG 76-22 to PG 70-22 or from PG 64-22 to PG 58-22 represents a one-grade reduction.

Inclusion of the rejuvenating agent in reclaimed asphalt can facilitate handling of the asphalt composition in one or more plant operations. Thus, in one aspect, the rejuvenating agent reduces the temperature required for mixing, at viscosities less than or equal to 200 mPa·s, by at least 5° C., preferably by at least 10° C. When high temperatures are needed to reach a viscosity of 200 mPa·s, the process can consume too much energy to be cost-effective. Thus, any reduction in the temperature needed to reach a reasonable viscosity for mixing is valuable. In another aspect, the rejuvenating agent reduces the temperature required for compaction, at viscosities less than or equal to 3000 mPa·s, by at least 5° C., preferably by at least 10° C. When high temperatures are needed to reach a viscosity of 3000 mPa·s, the process can consume too much energy to be cost-effective. Thus, any reduction in the temperature needed to reach a reasonable viscosity for compaction is valuable. As shown in Table 6, tall oil-derived ester-functional rejuvenating agents are effective in reducing the minimum temperature required for both mixing and compaction.

In another aspect, the invention relates to a rejuvenated binder. The rejuvenated binder comprises aged binder and an ester-functional rejuvenating agent derived from tall oil. The rejuvenating agent is present in an amount within the range of 0.1 to 20 wt. % based on the combined amounts of aged binder and rejuvenating agent. The rejuvenated binder has a ring and ball softening point by EN 1427 at least 5° C. lower than that of an aged binder without the rejuvenating agent and has a penetration value at 25° C. by EN 1426 at least double that of the aged binder without the rejuvenating agent. Suitable rejuvenating agents have already been described. Particularly preferred rejuvenating agents are trimethylolpropane tallates, ethylene glycol Monomerates, neopentyl glycol Monomerates, 2-ethylhexyl Monomerates, and glycerol Monomerates, especially ethylene glycol Monomerate and trimethylolpropane (TMP) tallate.

Preferred rejuvenated binders reach a force ductility, when measured by AASHTO T-300, of 1.0 J/cm2 at some temperature within the range of 15° C. to 25° C. Particularly preferred are rejuvenated binders that also have a ring and ball softening point less than 60° C. (see Table 9 and further discussion below).

Preferred binders demonstrate stability when the binder is subjected to short-term aging by the rolling thin-film oven (RTFO) test according to EN 12607-1 and long-term aging by the pressure aging vessel (PAV) test according to EN 14769. As shown in Table 12, rejuvenated binders of the invention are stable when exposed to laboratory conditions designed to simulate short-term or long-term aging of asphalt compositions.

One method of the invention comprises combining reclaimed asphalt with an ester-functional rejuvenating agent derived from tall oil. The reclaimed asphalt comprises aggregate and an aged asphalt binder. In this method, the rejuvenating agent has a titer by ASTM D1982 less than 30° C. and is used in an amount effective to reduce the glass-transition onset temperature of the aged asphalt binder by at least 5° C. compared with the glass-transition onset temperature of the aged asphalt binder without the rejuvenating agent.

In a related method, the reclaimed asphalt, the rejuvenating agent, or a mixture thereof is combined with virgin asphalt. The resulting asphalt composition comprises 1 to 99 wt. %, preferably 30 to 70 wt. %, of reclaimed asphalt based on the combined amounts of reclaimed asphalt, virgin asphalt, and rejuvenating agent.

In another related method, 0.1 to 20 wt. % of the rejuvenating agent is used based on the combined amounts of aged asphalt binder and rejuvenating agent.

In another related method, the rejuvenating agent is used in an amount effective to reduce the glass-transition onset temperature of the aged asphalt binder by at least 10° C., or in an amount effective to narrow the glass-transition temperature spread of the aged asphalt binder by at least 5° C.

In one inventive method, a binder composition comprising an aged asphalt binder is combined with an ester-functional rejuvenating agent derived from tall oil. The rejuvenating agent has a titer by ASTM D1982 less than 30° C. and is used in an amount effective to reduce the glass-transition onset temperature of the aged asphalt binder by at least 5° C. compared with the glass-transition onset temperature of the aged asphalt binder without the rejuvenating agent.

The invention includes uses for the asphalt compositions or binders of the invention. The asphalt compositions and binders can be used, e.g., for paved surfaces, road surfaces and subsurfaces, shoulders, bridges, bridge abutments, gravel substitutes for unpaved roads, and the like. In one aspect, the invention relates to a paved surface comprising an asphalt or binder composition of the invention.

The following examples merely illustrate the invention; the skilled person will recognize many variations that are within the spirit of the invention and scope of the claims.

Evaluation of Tall Oil-Derived Rejuvenating Agents in Reclaimed Asphalt Pavement: Reduction of Tg Onset Temperature in Aged Binders Method for Preparing RAP Binder with Rejuvenating Agents RAP is received in 40-lb. bags. Material is removed from the bag and allowed to air dry until no visible moisture remains. A sieve table with multiple gauge wire is utilized to separate the material into different sizes: large, medium, and fines.

The material classified as "large" is placed into a large fritted column with glass wool used as the primary filtration. Toluene/ethanol (85:15) is poured over the RAP and allowed to stand until gravity filtration is complete. The process is repeated multiple times until the solvent blend is almost void of coloration and clear. The "medium" and "fines" material is placed into a large Erlenmeyer flask, after which the same solvent blend is added to level. The material is agitated and the resultant solvent/asphalt mix is decanted. This process is also repeated to the same target.

The combined extracts are charged to a 5-gal. container and allowed to sit for 24 h to allow any dirt/rock fines to settle. The material is carefully decanted through a medium grade filter (Whatman #4). The filtrate is charged in batches to a 5-L flask, and the solvent is stripped under vacuum while warming to 40-50° C. Concentration continues until the material reaches a solids target of ~20-25%. All concentrated material is combined into a single container and the solvent is recovered and recycled.

Using the solids content as a guideline, concentrated material is charged to a 50-mL round-bottom flask based on a 2 g target. Additives to be evaluated are diluted to a minimum of 50% with toluene and charged to the same round bottom targeting a total addition of 0.2 g. The solution is then stripped under vacuum using a 150° C. oil bath for 0.5 h. The concentrated product remains under a nitrogen purge until it cools.

Differential Scanning Calorimetry (DSC) Analysis of Samples

Differential scanning calorimetry analysis is performed using a Thermal Analysis Inc. model Q2000 instrument using the following conditions: sample weight: 4-6 mg RAP; sample containment: TA Inc. standard aluminum pans and lids (TA Inc. part numbers 900786.901 and 900779.901); instrument purge: nitrogen, 50 mL/min.

Temperature program: Metrics for Tg are applied to data from segment (23) of the following method log: (1) Sampling interval 0.60 sec/pt; (2) zero heat flow at 0.0° C.; (3) equilibrate at 165.00° C.; (4) data storage off; (5) isothermal for 5.00 min; (6) mark end of cycle 1; (7) data storage on; (8) ramp 5.00° C./min to −45.00° C.; (9) data storage off; (10) isothermal for 5.00 min; (11) mark end of cycle 2; (12) data storage on; (13) ramp 10.00° C./min to 165.00° C.; (14) data storage off; (15) isothermal for 5.00 min; (16) mark end of cycle 3; (17) data storage on; (18) ramp 5.00° C./min to −85.00° C.; (19) data storage off; (20) isothermal for 5.00 min; (21) mark end of cycle 4; (22) data storage on; (23) ramp 10.00° C./min to 165.00° C.; (24) mark end of cycle 5; (25) end of method.

Curves are generated by plotting heat flow (W/g) as a function of temperature (° C.) over the range of −80° C. to 80° C. Inflection points representing the onset of glass transition and the end of glass transition are noted, and a midpoint is determined. The "spread" is the difference between the temperature at the end of glass transition and the glass transition onset temperature. Thus, for a sample having an onset Tg at −36° C. and an endpoint at 10° C., the spread is reported as 46° C. The values of Δ onset and Δ spread (each in ° C.) for each sample are reported in comparison to the average values obtained for multiple runs of the control sample of aged asphalt binder. The tested samples contain 90 wt. % of aged asphalt binder and 10 wt. % of potential rejuvenating agent additive unless otherwise noted in Tables 1 and 2.

A measurable impact on low-temperature properties of the RAP is expected if the onset of glass transition can be reduced by at least 5° C., and each of Examples 1-12 (Table 1) and Examples 27-54 (Table 2) satisfies this requirement. Rheofalt® distillate (cardanol), a long-chain alkylated phenol that is the principal component of a commercial rejuvenating agent, is provided for comparison.

Reduced fatigue cracking is normally inferred from improved homogeneity, which correlates with a narrower spread of the glass-transition temperature. Thus, an improvement in fatigue cracking may result from narrowing of the Tg spread by at least 5° C. relative to the control sample. Many of the samples reported in Tables 1 and 2 also meet this test and are considered more preferred.

Evaluation of Low, Intermediate, and High Temperature Performance of RAP Binder Rejuvenating Agents by Dynamic Shear Rheometry (DSR)

Samples of RAP binder containing 10 wt. % of rejuvenating agents A-G prepared as described above are submitted to an independent laboratory for evaluation of low, intermediate, and high-temperature properties using dynamic shear rheometry (DSR). Each of the samples, except for sample E, is found to be softened significantly by the rejuvenating agent. The rheological properties are used to assess rejuvenation products for use in high-RAP, hot and warm mix asphalt.

Dynamic shear moduli are measured using 4-mm diameter parallel plate geometry with a Malvern Kinexus® rotational dynamic shear rheometer. Frequency sweeps are performed at 15° C. intervals over a temperature range of −30 to 60° C. and an angular frequency range of 0.1 to 100 rad/sec (in some cases 0.1 to 50 rad/sec is used).

The control sample is an extracted binder without added rejuvenating agent. Stress sweeps are performed before each frequency sweep to ensure a low strain level and that the test results would be in the linear viscoelastic range.

High (70° C.) and in some cases low (−15° C.) performance parameters, such as G*/sin δ, master curves are extrapolated using the Christensen Anderson (CA) model (D. W. Christensen et al., J. Assoc. Asphalt Paving Technologists, 61 (1992) 67). The CA model relates the frequency dependence of the complex modulus to the glassy modulus ($G_g$), the cross-over frequency ($\omega_c$) and the rheological index (R). The form of the mathematical function is $$G*(\omega) = G_g \left[1 + \left(\frac{\omega_c}{\omega}\right)^{\left(\frac{\log 2}{R}\right)}\right]^{\frac{-R}{\log 2}}$$

The G(t) master curves are generated by interconverting the storage modulus (G'(ω)) using Christensen's approximate method (see Christensen, R. M., *Theory of Viscoelasticity* (1971) Academic Press, New York).

1. Low Temperature Properties

Low-temperature properties are measured with 4-mm plate rheometry. Bending beam rheometer (BBR) m-value and creep stiffness (S(t)) are estimated through a correlation developed by Sui et al ("A New Low-temperature Performance Grading Method using 4-mm Parallel Plates on a DSR," *Transportation Research Record* 2207 (2011) 43-48.).

M-value is the slope of the creep stiffness curve at the performance grade temperature plus 10° C. at 60 seconds. It is an indication of the asphalt's ability to relax stress. A minimum m-value of 0.3 is typically specified for laboratory RTFO/PAV (rolling thin film oven/pressure aging vessel) aged asphalts. Creep stiffness is used to evaluate the potential for high thermal stress development. A higher creep stiffness value indicates higher potential thermal stress development in the pavement, a maximum value of 300 MPa is typically specified. Creep stiffness is measured at the same time and temperature as m-value. Results of testing samples A-G appear in Table 3.

2. Intermediate Temperature Properties

Fatigue cracking resistance of an RTFO/PAV aged asphalt binder is typically evaluated using G* sin δ (a fatigue factor). G* represents the binder complex shear modulus and δ represents the phase angle. G* approximates stiffness and δ approximates the viscoelastic response of the binder. Binder purchase specifications typically require the factor to be less than 5 MPa. The factor is considered a measure of energy dissipation which is related to fatigue damage. The critical temperature range for fatigue damage is near the midpoint between the highest and lowest service temperatures. A test temperature of 25° C. is used. Results of testing samples A-G appear in Table 3.

3. High-Temperature Properties

High-temperature mechanical properties are evaluated by the parameter G*/sin δ. The factor is an indication of a binder's resistance to rutting. Binder purchase specifications typically require the factor to be greater than 2.2 kPa for RTFO aged asphalt and greater than 1 kPa before RTFO aging. In all of the tested samples, G*/sin δ decreases significantly with addition of the rejuvenating agent.

As shown in Table 3, samples A, B, C, and F show the most improvement in m-value, which directly relates to improvement in the ability of the material to relax and avoid thermal stress development that could lead to thermal cracking. G* sin δ provides an indication of fatigue performance. Samples F (glycerol Monomerate) and A (EG Monomerate) stand out as the highest ranked in terms of both (m-value) and (G* sin δ) improvement. Samples B, C, and D are somewhat effective. Comparative samples G (returned neutrals from sterols) and E (terpene phenol) rank last, with E being particularly ineffective.

TABLE 1

Effect of Rejuvenating Agents on RAP Binders: DSC Analysis

| Ex | Description | Tg onset, ° C. | Tg spread, ° C. | Δ onset, ° C. | Δ spread, ° C. |
|---|---|---|---|---|---|
| | Controls, ave. of 13 experiments | −36.7 | 47.5 | — | — |
| 1 | EG Monomerate, 2.5% | −41.4 | 46.2 | −4.7 | −1.3 |
| 2 | EG Monomerate, 5% | −47.8 | 47.0 | −11.1 | −0.5 |

TABLE 1-continued

Effect of Rejuvenating Agents on RAP Binders: DSC Analysis

| Ex | Description | Tg onset, °C. | Tg spread, °C. | Δ onset, °C. | Δ spread, °C. |
|---|---|---|---|---|---|
| 3 | EG Monomerate, 10% | −50.9 | 41.4 | −14.2 | −6.1 |
| 4 | TMP tallate, 2.5% | −43.4 | 56.8 | −6.7 | 9.3 |
| 5 | TMP tallate, 5% | −50.1 | 36.6 | −13.4 | −10.9 |
| 6 | TMP tallate, 10% | −53.9 | 32.6 | −17.2 | −14.9 |
| 7 | NPG Monomerate, 2.5% | −49.7 | 48.3 | −13.0 | 0.8 |
| 8 | NPG Monomerate, 5% | −49.4 | 43.0 | −12.7 | −4.5 |
| 9 | NPG Monomerate, 10% | −52.6 | 42.3 | −15.9 | −5.2 |
| 10 | Sylfat ® DP-6 tall oil pitch residue | −47.3 | 52.5 | −10.6 | 5.6 |
| 11 | Sylfat ® DP-8 tall oil pitch residue | −49.6 | 58.9 | −12.9 | 11.4 |
| 12 | EG ester of heads | −56.3 | 47.8 | −19.6 | 0.3 |
| C13 | Rheofalt ® distillate (cardanol) | −47.3 | 38.2 | −10.6 | −9.3 |
| C14 | Virgin asphalt, 100% | −37.9 | 42.4 | −1.2 | −5.1 |
| C15 | Palm oil | −51.0 | 54.1 | −14.3 | 6.6 |
| C16 | High-hydroxyl rosin ester | −31.6 | 46.8 | 5.1 | −0.7 |
| C17 | Nonyl phenol | −41.0 | 49.2 | −4.3 | 1.7 |
| C18 | Sylvares ® TP 96 | −29.8 | 36.5 | 6.9 | −11.0 |
| C19 | Tergitol ® NP-40 nonylphenol ethoxylate | −39.4 | 43.8 | −2.7 | −3.7 |
| C20 | Crude sterols | −33.4 | 38.9 | 3.3 | −8.6 |
| C21 | Heavy neutrals from sterols | −37.0 | 45.0 | −0.3 | −2.5 |
| C22 | Returned neutrals from sterols | −33.0 | 36.8 | 3.7 | −10.7 |
| C23 | TRA 25 polyterpene | −31.6 | 37.3 | 5.1 | −10.2 |
| C24 | Sylvaprint ® 9205 phenolic rosin ester | −29.4 | 39.5 | 7.3 | −8.0 |
| C25 | Cenwax ® G hydrogenated castor oil | −34.8 | 51.4 | 1.9 | 3.9 |
| C26 | Tudalen ® 65 hydrocarbon flux oil | −37.5 | 40.3 | −1.6 | −6.6 |

Sylfat ®, Sylvaprint ®, Sylvares ®, Sylvatol ®, Cenwax ®, and Uniflex ® are trademarks of Arizona Chemical Company.
RheoFalt ® is a trademark of Ventraco, B.V.
Tudalen ® is a trademark of H&R Group.
Tergitol ® is a trademark of Dow Chemical.

TABLE 2

Effect of Rejuvenating Agents on RAP Binders: DSC Analysis

| Ex | Description | Tg onset, °C. | Tg spread, °C. | Δ onset, °C. | Δ spread, °C. |
|---|---|---|---|---|---|
|  | Controls, ave of 22 experiments | −35.8 | 46.9 | — | — |
| 27 | TMP tallate (Scandinavia) | −52.0 | 38.5 | −16.1 | −8.4 |
| 28 | TMP tallate (US) | −53.9 | 32.8 | −18.1 | −14.1 |
| 29 | Methyl tallate | −48.0 | 49.6 | −12.1 | 2.7 |
| 30 | Glycerol tallate | −48.6 | 36.9 | −12.1 | −10.0 |
| 31 | Oleyl tallate | −51.4 | 31.6 | −15.6 | −15.3 |
| 32 | Octyl tallate | −52.5 | 33.4 | −16.7 | −13.5 |
| 33 | PE tallate | −50.9 | 40.9 | −15.1 | −6.0 |
| 34 | EG tallate | −53.6 | 30.0 | −17.7 | −16.9 |
| 35 | Benzyl tallate | −52.6 | 32.9 | −16.8 | −14.0 |
| 36 | 2-Ethylhexyl tallate | −57.6 | 39.5 | −21.7 | −7.4 |
| 37 | PEG (200) tallate | −50.9 | 40.9 | −15.1 | −6.0 |
| 38 | TMP ester rosin/TOFA | −52.6 | 42.7 | −16.8 | −4.2 |
| 39 | Pitch ester | −55.0 | 59.1 | −19.2 | 12.2 |
| 40 | Sylvatal ® FA-7001, 2-ethylhexyl ester | −46.0 | 47.2 | −10.1 | 0.3 |
| 41 | Uniflex ® 1803 (glycerol Monomerate) | −57.5 | 63.0 | −21.7 | 16.1 |
| 42 | Glycerol Monomerate | −51.7 | 43.1 | −15.9 | −3.8 |
| 43 | TMP Monomerate | −50.2 | 43.7 | −14.4 | −3.2 |
| 44 | Uniflex ® 210 (NPG Monomerate) | −51.5 | 34.4 | −15.7 | −12.5 |
| 45 | EG ester of Monomer | −52.3 | 34.5 | −16.5 | −12.4 |
| 46 | 2-Ethylhexyl Monomerate | −55.5 | 37.6 | −19.7 | −9.3 |
| 47 | EG Monomerate/Sylvares ® TP 96 (1:1) | −42.8 | 41.9 | −7.0 | −5.0 |
| 48 | Uniflex ® 936E (TMP/MO6 fatty acid) | −47.7 | 48.5 | −11.8 | 1.6 |
| 49 | EG ester of crude dimer | −44.7 | 48.8 | −8.9 | 1.9 |
| 50 | 2-Ethylhexyl crude dimerate | −52.5 | 41.9 | −16.6 | −5.0 |
| 51 | Uniflex ® 102H (2-ethylhexyl dimerate) | −59.3 | 51.8 | −23.5 | 4.9 |
| 52 | Uniflex ® 10 (2-ethylhexyl dimerate) | −51.6 | 46.6 | −15.7 | −0.3 |
| 53 | Uniflex ® 540 (2EH/NPG dimerate) | −52.6 | 52.1 | −16.8 | 5.2 |
| 54 | 2-Ethylhexyl trimerate | −48.8 | 46.9 | −12.9 | 0.1 |

TABLE 3

Evaluation of Low, Intermediate, and High Temperature Performance of RAP Binder Rejuvenating Agents by Dynamic Shear Rheometry (DSR)

|  | control | A | B | C* | D | E* | F | G* |
|---|---|---|---|---|---|---|---|---|
| Creep stiffness, −15° C., MPa | 67 | 22 | 22 | 22 | 25 | 57 | 21 | — |
| m-Value, −15° C. | −0.42 | −0.56 | −0.56 | −0.61 | −0.55 | −0.47 | −0.61 | −0.52 |
| % improvement | — | 33 | 33 | 45 | 31 | 12 | 45 | 24 |
| G* sin δ 25° C., kPa | 7694 | 518 | 535 | 631 | 1392 | 7525 | 397 | 2928 |
| % improvement | — | 93 | 93 | 92 | 82 | 2.2 | 95 | 62 |
| G*/sin δ, 70° C., kPa | 47 | 2.5 | 1.9 | 1.6 | 3.0 | 6.5 | 3.5 | 12 |
| Overall rank | — | 2 | 3 | 3 | 4 | 6 | 1 | 5 |

*Comparative examples
A = EG Monomerate;
B = TMP tallate;
C = Cardanol;
D = 50/50 blend of A and E;
E = Sylvares ® TP-96 terpene phenol;
F = glycerol Monomerate;
G = returned neutrals from sterols Cloud Point, Pour Point, and Low-Temperature Performance Cloud point is found by cooling a neat, molten sample gradually and observing the temperature at which the clear sample just becomes hazy. Pour point is the lowest temperature at which a liquid sample remains pourable.

Table 4 summarizes these properties for samples of aged binder and for the rejuvenating agents listed in the table. As shown in Table 4, the rejuvenating agents with the best low-temperature properties are those with relatively low cloud and pour points. Of particular note are rejuvenating agents that comprise the fatty esters from improved thermal stability alcohols (neopentyl glycol, pentaerythritol, etc.), which have exceptionally low cloud points (less than −25° C.) and pour points (less than −50° C.). These additives do not undergo phase changes within the temperature window for the binder's application and generally deliver excellent low- and high-temperature performance to the rejuvenated binder.

TABLE 4

Low-Temperature Properties for Aged Binder and Various Rejuvenating Agents

|  | Cloud Point (° C.) | Pour Point (° C.) | Low T properties |
|---|---|---|---|
| Aged binder (AB) | not applicable | >20 | very poor |
| petroleum wax* | >20 | >20 | very poor |
| petroleum flux oil* | not available | 10 | poor |
| vegetable oil[5]* | −11 to above 20 | −20 to 22 | very poor to fair |
| cardanol* | not available | −32 | good |
| fatty ester[1,3] | −20 to 14 | −37 to −4 | very poor to good |
| fatty ester[2,4] | <−25 | −58 to −55 | excellent |

[1]From alcohols other than improved thermal stability alcohols.
[2]From "improved thermal stability alcohols," e.g., TMP, TME, NPG, PE, di-PE.
[3]Representative examples: glycerol tallate, EG tallate, 2-ethylhexyl tallate, octyl tallate, methyl tallate, PEG (200) tallate.
[4]Representative examples: TMP isostearate, TMP tallate.
[5]Representative examples: palm, canola, sunflower, peanut, soybean oils.
*Comparative examples.

Additional Evaluation of Tall Oil-Derived Rejuvenating Agents

Several ester-functional rejuvenating agents derived from tall oil are further evaluated, particularly ethylene glycol (EG) Monomerate, and trimethylolpropane (TMP) tallate. These are compared with Sylvatac® rosin esters RE40 and RE55, products of Arizona Chemical, which have ring and ball softening points of about 40 and 55° C., respectively.

The binders tested are aged binder recovered from reclaimed asphalt and laboratory aged binder (both identified as "AB").

Laboratory aged binder is prepared in two steps. The first step is the rolling thin film oven (RTFO) test, which is performed in accord with EN 12607-1. This reflects short-term aging that normally occurs during manufacture, transport, and laying of asphalt. The RTFO test involves heating binder in glass cylinders on a rotating carousel in an air-blown oven at 163° C. for 75 minutes after it reaches the desired temperature. After the test, mass loss is recorded and binder properties are measured.

The second step is pressure aging vessel (PAV) testing in accord with EN 14769. In the PAV test, binder samples are heated in an oven at 90 to 110° C. under 2.07 MPa of pressure for 20 h. After the test, mass loss is recorded and binder properties are measured.

In one study, basic properties of the rejuvenated binder are investigated. Ring and ball softening point of the binder, measured according to EN 1427, reflects the consistency of the binder at high temperature. The higher the softening point, the more heat required to soften it or induce flow. Penetration values at 25° C. of the binder, measured according to EN 1426, reflect the consistency of the binder at ambient temperature. Higher values correspond to softer binders. Viscosities at 90, 135, 150, and 180° C. are measured in accord with EN 13302. The results indicate how easy it will be to store, pump, mix, compact, lay, or otherwise handle the asphalt in day-to-day operations. Penetration index (PI) quantifies the way that the asphalt consistency varies with temperature. It is calculated from:

$$PI = \frac{20 - \{500[2.903 - \log(Pen)]/(T - 25)\}}{\{50[2.903 - \log(Pen)]/(T - 25)\} + 1}$$

where Pen is the penetration value at 25° C. and T is the ring and ball softening temperature (in ° C.). Virgin binder typically has a negative PI, while oxidation tends to push the PI into positive values. Thus, a negative value of PI is more desirable.

Table 5 summarizes the results from this study. Ideally, the rejuvenating agent restores the properties of the aged binder to make it perform more like virgin binder. Thus, the softening point of the rejuvenated binder should be reduced by at least 5° C., preferably at least 10° C., compared with that of the aged binder, and its penetration value at 25° C. should be increased by at least double, preferably triple, that of the aged binder. As shown in the table, TMP tallate effectively achieves those results with as little as 5 wt. % based on the combined amounts of aged binder and TMP tallate. Sylvatac® RE55, a rosin ester with a 55° C. softening point, is ineffective in restoring basic properties of the aged binder to those found in virgin binder.

Table 6 summarizes results of experiments performed to determine the amount of rejuvenating agent needed to achieve desirable softening while maintaining an acceptably low penetration value. With EG Monomerate and TMP tallate, softening point is reduced by at least 5° C. with about 4-5 wt. % of rejuvenating agent while maintaining a penetration value at 25° C. that matches that of virgin binder 35/50. In contrast, Sylvatac® RE55 does not restore these properties to the aged binder even at 10 wt. % additive.

Viscosity curves for rejuvenated binders help to identify the ability of rejuvenating agents to facilitate asphalt compaction, mixing, and other handling properties. Table 7 shows that the minimum temperature at which viscosity is suitable for compaction (<3000 mPa·s) can be reduced by as much as 20° C. by combining aged binder with an ester-functional rejuvenating agent derived from tall oil. Moreover, the minimum temperature at which viscosity is suitable for mixing (<200 mPa·s) can also be reduced by as much as 20° C.

TABLE 7

Viscosity and Compaction or Mixing

| | Minimum temperature (° C.) at which viscosity <3000 mPa · s (Compaction requirement) | Minimum temperature (° C.) at which viscosity <200 mPa · s (Mixing requirement) |
|---|---|---|
| Aged binder (AB) | 130 | 180 |
| AB + 5% EG Monomerate | 120 | 172 |
| AB + 5% TMP tallate | 122 | 175 |
| AB + 5% Sylvatac ® RE55* | 127 | 180 |
| AB + 10% EG Monomerate | 109 | 160 |
| AB + 10% TMP tallate | 113 | 160 |
| AB + 10% Sylvatac ® RE55* | 125 | 175 |

*Comparative example

Particularly in the United States, dynamic shear rheometry (DSR) is used to evaluate asphalt products to assess their likely performance at low, ambient, and elevated temperatures. At low temperatures (e.g., −10° C.), road surfaces need cracking resistance. Under ambient conditions, stiffness and fatigue properties are important. At elevated temperature, roads need to resist rutting when the asphalt becomes too soft. Criteria have been established by the asphalt industry to identify rheological properties of a binder that correlate with likely paved road surface performance over the three common sets of temperature conditions.

TABLE 5

Effect of Rejuvenating Agent on Penetration, Softening Point, and Viscosities of Binders

| | penetration at 25° C., dmm | ring & ball soft. pt, ° C. | penetration index | Viscosity, mPa · s | | | |
|---|---|---|---|---|---|---|---|
| | | | | 90° C. | 135° C. | 150° C. | 180° C. |
| aged binder (AB) | 13 | 67.3 | −0.369 | 90,400 | 1,858 | 850 | 213 |
| virgin binder, 35/50 | 41 | 52.8 | −0.966 | — | — | — | — |
| virgin binder, 50/70 | 53 | 49.2 | −1.268 | 11,880 | 528 | 261 | 86 |
| AB + 5% TMP tallate | 32 | 58.1 | −0.359 | 32,130 | 1,160 | 545 | 153 |
| AB + 10% TMP tallate | 72 | 49.3 | −0.482 | 13,320 | 755 | 310 | 105 |
| AB + 5% Sylvatac ® RE55 rosin ester* | 13 | 65.0 | −0.731 | 63,500 | 1,465 | 658 | 178 |

*Comparative example

TABLE 6

Impact of Dosage of Rejuvenating Additive on Ring and Bail Softening Point and Penetration Values

| | Pen | R&B |
|---|---|---|
| Aged binder (AB) | 13 | 67 |
| Virgin binder, 35/50 | 35 | 58 |
| Virgin binder, 50/70 | 50 | 54 |

| | EG Monomerate | | TMP tallate | | Sylvatac ® RE55* | |
|---|---|---|---|---|---|---|
| | Pen | R&B | Pen | R&B | Pen | R&B |
| AB + 1% additive | — | — | 17 | 65 | — | — |
| AB + 3% additive | 23 | 62 | 24 | 63 | 13 | 65 |
| AB + 5% additive | 34 | 58 | 32 | 58 | 13 | 65 |
| AB + 10% additive | 87 | 48 | 72 | 49 | 14 | 62 |

*Comparative example

Thus, for low temperatures, the complex modulus (G*) of the rejuvenated binder measured at −10° C. should be less than or equal to the value for virgin binder. For 30/50 grade virgin binder, G* at −10° C. is ideally at or below $2.8 \times 10^8$ Pa (see Table 8). Aged binder is not dramatically different from virgin binder in this property, and the low-temperature criteria is satisfied with 1 wt. % of EG Monomerate or TMP tallate (but see results with Sylvatac® RE55, which does not improve this parameter even at 10 wt. %).

At ambient temperatures, the complex modulus of the rejuvenated binder should be less than or equal to the value for virgin binder. For 30/50 grade virgin binder, G* at 20° C. is ideally at or below $6.0 \times 10^6$ Pa. This stiffness criteria can be satisfied with about 4 wt. % of EG Monomerate or TMP tallate (Table 8). Again, Sylvatac® RE55 does not improve this property at 10 wt. %.

TABLE 8

Summary of Dynamic Shear Rheometry Results, Part 1

|  | Stiffness Criteria G* at 20° C. (Pa) | Low-Temperature Criteria G* at −10° C. (Pa) |
|---|---|---|
| Aged binder (AB) | $2.0 \times 10^7$ | $3.1 \times 10^8$ |
| Virgin blinder, 30/50 | $6.0 \times 10^6$ | $2.8 \times 10^8$ |
| AB + 5% EG Monomerate | $4.7 \times 10^6$ | $1.8 \times 10^8$ |
| AB + 10% TMP tallate | $1.2 \times 10^6$ | $7.5 \times 10^7$ |
| AB + 10% EG Monomerate | $1.0 \times 10^6$ | $1.0 \times 10^8$ |
| AB + 10% Sylvatac ® RE55* | $2.0 \times 10^7$ | $3.0 \times 10^8$ |
| Conclusion: | Can meet stiffness criteria with about 4 wt. % additive. | Can meet low-temperature criteria with at least 1 wt. % additive |

*Comparative example

Fatigue criteria also relates to ambient temperature performance. The product of the complex modulus (G*) and the sine of the phase angle (δ) measured at 10 rad/s is determined. The temperature at which the value of G*sin δ at 10 rad/s equals 5.0×106 Pa should be less than or equal to 20° C. for rejuvenated binders comparable to 35/50 grade virgin binder. As shown in Table 9, the fatigue criteria can be met when at least about 4 wt. % of EG Monomerate or TMP tallate is used, while Sylvatac® RE55 shows no improvement relative to aged binder.

At high temperatures, the quotient G*/sin δ is of interest. The temperature at which the value of G*/sin δ at 10 rad/s equals 1000 Pa should be reduced for rejuvenated binders compared with that of aged binder. For 30/50 grade virgin binder, the temperature at which G*/sin δ at 10 rad/s equals 1000 Pa is about 70° C. (see Table 9). The high-temperature criteria is generally satisfied with up to about 10 wt. % of tall oil-derived rejuvenating agent.

TABLE 9

Summary of Dynamic Shear Rheometry Results, Part 2

|  | High-Temperature Criteria Temperature at which G*/sin δ at 10 rad/s = 1000 Pa (° C.) | Fatigue Criteria Temperature at which G*sin δ at 10 rad/s = 5.0 × 10⁶ Pa (° C.) |
|---|---|---|
| Aged binder (AB) | 90 | 26 |
| Virgin binder, 30/50 | 70 | 20 |
| AB + 5% EG Monomerate | 79 | 18 |
| AB + 10% TMP tallate | 69 | 10 |
| AB + 10% EG Monomerate | 68 | 10 |
| AB + 10% Sylvatac ® RE55* | 85 | 26 |
| Conclusion: | Can meet high-T criteria with up to 10 wt. % additive. | Can meet fatigue criteria with at least 4 wt. % additive |

*Comparative example

Table 10 summarizes the results of a ductility study. In general, force ductility relates to the energy needed to stretch a binder sample 200 or 400 mm at a given temperature, and is a measure of strength and flexibility. Lower energies correspond to more flexible samples. Ductility relates to elongation at rupture for a given temperature, typically 5° C. (for softer binders) or 15° C. Higher elongations are usually better. In these experiments, TMP tallate and Sylvatac® RE40 (softening point about 40° C.) are compared. Force ductility is measured at three temperatures for each sample. The test method used is AASHTO T-300.

In general, the rejuvenating agents restore at least some of the ductility that the virgin binder loses during aging. Comparing the results in Table 10, TMP tallate (5 wt. %) outperforms Sylvatac® RE40 (5 wt. %). It is helpful to compare the results at a baseline energy level, such as 1 J/cm2 and ask at what temperature this force ductility value is achieved. As shown in the table, this value is 28° C. for aged binder and 17° C. for virgin binder. Rejuvenating agent helps the binder rival the targeted value of 17° C.

Table 11 provides results of a gyratory compaction study (by EN 12697-31) in which 75 wt. % of reclaimed asphalt pavement (RAP) is combined with virgin binder and aggregate, with or without rejuvenating agent. TMP tallate is used at 6 wt. % based on the amount of aged binder present in the RAP. The results after 10 gyrations indicate how well mixing is occurring. The void content after 60 or 100 gyrations is also of interest. The compaction study is complete after 200 gyrations. In general, we found that, compared with a control mixture with no RAP, the use of RAP makes it easier to achieve a low void content. Additionally, void content remains desirably low when TMP tallate is included as a rejuvenating agent. ASTM D6925 can also be used.

Water sensitivity by EN 12697-12 is also evaluated for asphalt mixtures containing 75 wt. % RAP, and those results appear in Table 12. Compared with a control mixture, the ratio of wet to dry indirect tensile strength (wet ITS/dry ITS) decreases with RAP, indicating significant water sensitivity. However, inclusion of 6 wt. % TMP tallate makes the RAP-containing mixture behave more like the control, i.e., it reduces the water sensitivity of the asphalt mixture.

TABLE 10

Force Ductility of Binders

|  | Energy E0.2 ||||| Energy E0.4 ||||| T at 1 | R&B, |
|---|---|---|---|---|---|---|---|---|---|---|---|---|
|  | 15° C. | 20° C. | 25° C. | 30° C. | 35° C. | 15° C. | 20° C. | 25° C. | 30° C. | 35° C. | J/cm², ° C. | ° C. |
| Virgin binder, 40/60 | 1.56 | 0.424 | 0.138 | — | — | 1.74 | 0.504 | 0.178 | — | — | 17 | 52 |
| Aged binder (AB) | — | — | — | 0.723 | 0.343 | — | — | — | 0.808 | 0.441 | 28 | 65 |

TABLE 10-continued

Force Ductility of Binders

|  | Energy E0.2 | | | | | Energy E0.4 | | | | | T at 1 | R&B, |
| --- | --- | --- | --- | --- | --- | --- | --- | --- | --- | --- | --- | --- |
|  | 15° C. | 20° C. | 25° C. | 30° C. | 35° C. | 15° C. | 20° C. | 25° C. | 30° C. | 35° C. | J/cm$^2$, ° C. | ° C. |
| AB + 5% TMP tallate | 2.09 | 0.941 | 0.369 | — | — | 2.34 | 1.05 | 0.421 | — | — | 20 | 56 |
| AB + 5% RE40* | — | — | 0.992 | 0.432 | 0.209 | — | — | 1.06 | 0.533 | 0.309 | 25 | 61 |

*Comparative example

TABLE 11

Gyratory Compaction: % Void Content v. Number of Gyrations

| | Number of gyrations | | | | |
| --- | --- | --- | --- | --- | --- |
| | 0 | 10 | 60 | 100 | 200 |
| Control mixture | 22.5 | 13.3 | 7.5 | 6.0 | 4.2 |
| Reference mixture (75% RAP) | 18.8 | 7.9 | 3.0 | 2.2 | 1.5 |
| 75% RAP + 6% TMP tallate | 18.5 | 9.6 | 4.4 | 3.2 | 2.0 |

TABLE 12

Water sensitivity: Ratio of Wet to Dry Indirect Tensile Strength

| | Density (g/cm$^3$) | Indirect tensile strength, dry, kPa | Indirect tensile strength, wet, kPa | Wet ITS/ Dry ITS % |
| --- | --- | --- | --- | --- |
| Control mixture | 2.47 | 2.11 | 1.67 | 79 |
| Reference mixture (75% RAP) | 2.48 | 2.73 | 1.69 | 62 |
| 75% RAP + 6% TMP tallate | 2.48 | 1.73 | 1.31 | 76 |

The laboratory methods used to age binder to make it behave more like the aged binders found in reclaimed asphalt have already been discussed. As noted, the RTFO test, or rolling thin film oven test, is used to assess short-term aging effects, while the PAV (pressure aging vessel) test assesses long-term aging.

Table 13 compares basic properties of rejuvenated binders before and after aging using first the RTFO test and then the PAV test. In all cases with rejuvenated binder, the cumulative mass loss is about 1 wt. % or less, which is consistent with the results seen using virgin binder. Thus, there is no adverse impact on mass loss when a rejuvenating agent is used.

Following the aging steps, the ring and ball softening point of all of the tested binders increases somewhat. However, the overall increase (see far right column, Δ R&B) is in line with the increase seen with virgin binder. In other words, the ester-functional rejuvenating agent does not appear to accelerate short- or long-term aging of the binder. Similarly, the penetration values are not adversely impacted by aging. If anything, when compared with virgin binder, a higher proportion of the original penetration value of the binder is maintained when the rejuvenating agent is present (compare the Ret. Pen. % values at the far right of Table 13).

TABLE 13

Effect of Aging on Binder Properties

| | Fresh | | After RTFO | | | | | After RTFO and PAV | | | | |
| --- | --- | --- | --- | --- | --- | --- | --- | --- | --- | --- | --- | --- |
| | Pen | R&B, ° C. | Pen | R&B, ° C. | Mass loss, % | Ret. Pen, % | Δ R&B, ° C. | Pen | R&B, ° C. | Mass loss, % | Ret. Pen, % | Δ R&B, ° C. |
| Aged binder (AB) | 21 | 66 | | | | | | | | | | |
| Virgin binder, 70/100 | 75 | 47 | | | | | | | | | | |
| Virgin binder, 40/60 | 47 | 52 | 35 | 57 | −0.36 | 76 | 6 | 28 | 64 | −0.47 | 60 | 12 |
| 70/100 + 5% TMP tallate | 176 | 37 | 109 | 43 | −0.32 | 62 | 7 | 55 | 51 | −0.50 | 31 | 15 |
| AB + 70/100 | 35 | 56 | 32 | 60 | −0.43 | 91 | 4 | 26 | 65 | −0.42 | 75 | 8 |
| AB + 70/100 + TMP tallate | 37 | 58 | 33 | 61 | −0.60 | 90 | 3 | 26 | 65 | −0.43 | 71 | 8 |
| AB + 40/60 + TMP tallate | 41 | 56 | 35 | 58 | −0.55 | 84 | 2 | 29 | 64 | −0.46 | 71 | 8 |
| AB + 5% TMP tallate | 42 | 56 | 36 | 59 | −0.62 | 86 | 2 | 30 | 64 | −0.47 | 71 | 7 |
| AB + 70/100 + TMP tallate* | 36 | 58 | 30 | 60 | −0.55 | 84 | 3 | 26 | 66 | −0.43 | 73 | 8 |
| AB + 70/100 + cardanol | 39 | 56 | 36 | 59 | −0.60 | 94 | 3 | 29 | 65 | −0.46 | 75 | 8 |
| AB + 70/100 + veg. oil | 38 | 55 | 33 | 59 | −0.62 | 86 | 4 | 27 | 66 | −0.47 | 70 | 10 |

*EU sourced.

Pen = penetration at 25° C. in dmm.

R&B = ring and ball softening point.

Ret. Pen. is the % of penetration value retained after the aging step.

Δ R&B is the change in softening point after aging.

RTFOT is the rolling thin-film oven test;

PAV is the pressure aging vessel test.

We claim:
1. An asphalt composition comprising:
   (i) aggregate; and
   (ii) 5 to 95 wt. % of reclaimed asphalt pavement (RAP) based upon the amount of asphalt composition comprising:
      a rejuvenated binder comprising:
         (a) 2 to 8 wt. % of aged asphalt binder based upon the amount of RAP; and
         (b) 0.1 to 15 wt. % of an ester-functional rejuvenating agent based upon the amount of aged asphalt binder,
   wherein the ester-functional rejuvenating agent has a titer by ASTM D1982 less than 30° C. and is present in an amount effective to reduce the glass-transition onset temperature of the aged asphalt binder by at least 5° C. compared with the glass-transition onset temperature of the aged asphalt binder without the rejuvenating agent.

2. The composition of claim 1 further comprising virgin asphalt, said virgin asphalt comprising virgin binder and virgin aggregate, wherein the asphalt composition comprises 1 to 99 wt. % of virgin aggregate based on the combined amounts of virgin asphalt, reclaimed asphalt, and rejuvenating agent.

3. The composition of claim 1 wherein the rejuvenating agent is present in an amount effective to reduce the glass-transition onset temperature of the aged asphalt binder by at least 10° C.

4. The composition of claim 1 wherein the rejuvenating agent is present in an amount effective to narrow the glass-transition temperature spread of the aged asphalt binder by at least 5° C. compared with the glass-transition temperature spread without the rejuvenating agent.

5. The composition of claim 1 wherein the rejuvenating agent is selected from the group consisting of trimethylolpropane tallates, ethylene glycol Monomerates, neopentyl glycol Monomerates, 2-ethylhexyl Monomerates, and glycerol Monomerates.

6. The composition of claim 1 wherein the rejuvenating agent is an ester derived from tall oil fatty acid, Monomer acid, and dimer acids.

7. The composition of claim 1 wherein the at least one improved thermal stability alcohol comprises a quaternary carbon located beta to the oxygen of any of its hydroxyl groups.

8. The composition of claim 1 wherein the at least one improved thermal stability alcohol comprises trimethylolethane, trimethylolpropane, neopentyl glycol, pentaerythritol, dipentaerythritol, benzylic alcohols and mixtures thereof.

9. A paved surface comprising the asphalt composition of claim 1.

* * * * *